United States Patent
Thuo et al.

(10) Patent No.: US 11,364,542 B2
(45) Date of Patent: *Jun. 21, 2022

(54) MECHANO-CHEMICAL DE-MIXING OF METAL ALLOYS AND MIXED MATERIALS

(71) Applicant: Iowa State University Research Foundation, Inc., Ames, IA (US)

(72) Inventors: Martin Thuo, Ames, IA (US); Jacob Sporrer, Berkeley, CA (US); Christophe Frankiewicz, Boone, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 84 days.

This patent is subject to a terminal disclaimer.

(21) Appl. No.: 16/924,408

(22) Filed: Jul. 9, 2020

(65) Prior Publication Data
US 2020/0338642 A1 Oct. 29, 2020

Related U.S. Application Data

(63) Continuation of application No. 15/731,498, filed on Jun. 20, 2017, now Pat. No. 10,758,984.

(60) Provisional application No. 62/493,109, filed on Jun. 22, 2016.

(51) Int. Cl.
| | |
|---|---|
| *B22F 9/30* | (2006.01) |
| *C01G 3/02* | (2006.01) |
| *C01G 19/02* | (2006.01) |
| *C22B 30/06* | (2006.01) |
| *C22B 1/00* | (2006.01) |
| *C22B 7/00* | (2006.01) |
| *C22B 59/00* | (2006.01) |
| *B22F 9/02* | (2006.01) |

(52) U.S. Cl.
CPC .......... *B22F 9/30* (2013.01); *B22F 9/02* (2013.01); *C01G 3/02* (2013.01); *C01G 19/02* (2013.01); *C22B 1/005* (2013.01); *C22B 7/00* (2013.01); *C22B 7/005* (2013.01); *C22B 30/06* (2013.01); *C22B 59/00* (2013.01); *Y02P 10/20* (2015.11)

(58) Field of Classification Search
CPC .................. B22F 9/30; C22B 30/06
USPC ........................................ 75/343
See application file for complete search history.

(56) References Cited

U.S. PATENT DOCUMENTS

| | | |
|---|---|---|
| 4,042,374 A | 8/1977 | Rasmussen et al. |
| 10,758,984 B2 * | 9/2020 | Thuo ................. C22B 59/00 |
| 2017/0036861 A1 | 12/2017 | Thuo et al. |

OTHER PUBLICATIONS

"U.S. Appl. No. 15/731,498, Advisory Action dated Mar. 30, 2020", 3 pgs.
"U.S. Appl. No. 15/731,498, Examiner Interview Summary dated Feb. 12, 2020", 4 pgs.
"U.S. Appl. No. 15/731,498, Final Office Action dated Dec. 23, 2019", 6 pgs.
"U.S. Appl. No. 15/731,498, Non Final Office Action dated Jul. 31, 2019", 6 pgs.
"U.S. Appl. No. 15/731,498, Notice of Allowance dated Apr. 29, 2020", 8 pgs.
"U.S. Appl. No. 15/731,498, Response filed Mar. 23, 2020 to Final Office Action dated Dec. 23, 2019", 8 pgs.
"U.S. Appl. No. 15/731,498, Response filed Jul. 8, 2019 to Restriction Requirement dated Jun. 10, 2019", 7 pgs.
"U.S. Appl. No. 15/731,498, Response filed Oct. 29, 2019 to Non Final Office action dated Jul. 31, 2019", 9 pgs.
"U.S. Appl. No. 15/731,498, Response filed Nov. 22, 2019 to Non-Final Office Action dated Jul. 31, 2019", 9 pgs.
"U.S. Appl. No. 15/731,498, Restriction Requirement dated Jun. 10, 2019", 6 pgs.
Liu, Ju, et al., "Isogeometric analysis of the advective Cahn-Hillaard equation: Spinodal decomposition under shear flow", Journal of Computational Analysis, 242, (2013), 321-350.
Lowengrub, J S, et al., "Surface Phase Separation and Flow in a Simple Model of Multicomponent Drops and Vesicles", FDMP, vol. 3, No. 1, (2007), 1-19.
Tevis, I. D, et al., "Synthesis of Liquid Core-Shell Particles and Solid Patchy Multicomponent Particles by Shearing Liquids Into Complex Particles (SLICE)", Langmuir, 30, (2014), 14308-14313.

* cited by examiner

*Primary Examiner* — Weiping Zhu
(74) *Attorney, Agent, or Firm* — Schwegman Lundberg & Woessner, P.A.

(57) ABSTRACT

A physical and chemical method is provided for de-mixing (e.g. extracting, separating, purifying and/or enriching) the metal constituents of an alloy or mixed material into different droplet or solid particle products that are highly enriched in the respective phases of the metal. The method involves for instance but is not limited to, shearing, separating and segregating metallic droplets and particles in a carrier fluid to form other droplets or particles that are each separately highly enriched in one of some, if not all, of the constituent phases of the alloy or mixed material.

20 Claims, 6 Drawing Sheets

EDS Results
≈ 99 wt% Bi

EDS Results
≈ 99 wt% Bi

EDS Results
≈ 80 wt % Sn

BiInSn [eutectic, 32.5%wt. Bi, 51%wt. In, 16.5%wt. Sn, M.P.= 62°C, blender at 80°C, 5% AA/DEG)
After 15' shearing time After 15' shearing time, the phases are separated, with Bi and In phases solids, as particles, and Sn dissolved in solution.

After 30' shearing time and above

NdFeB magnetic particles in 0.4%AA / DEG, m.p. = 1400°C blender @ 110°C
After 30 minutes NdFeB magnetic particles in 0.4%AA / DEG, m.p. = 1400°C blender @ 45°C
After 180 minutes

MECHANO-CHEMICAL DE-MIXING OF METAL ALLOYS AND MIXED MATERIALS

RELATED APPLICATION

This application is a continuation of U.S. application Ser. No. 15/731,498, filed Jun. 20, 2017, which claims priority and benefit of provisional application Ser. No. 62/493,109 filed Jun. 22, 2016, the entire disclosures of whis are incorporated herein by reference in their entirety.

FIELD OF THE INVENTION

The present invention relates to a physical-chemical method to de-mix (e.g. extract, separate, purify and enrich) metal, and similar/related, constituents of an alloy or a mixture of materials into different particulate products that are highly enriched in one component of the alloy or mixture.

BACKGROUND OF THE INVENTION

There are several techniques employed for separating and purifying of metal components from metal alloys. These techniques involve for instance ion exchange separation, selective extraction, solvent extraction, and low temperature molten salt smelting.

Vacuum distillation or zone melting or a combination of these techniques also have been used to obtain high purity bismuth from alloys thereof.

Phase segregation in metal alloys induced by mechanical stress is well understood from the Cahne-Larche models. Similarly, Effect of interfacial surface energy on directional spinodal decomposition in deformable spheres under flow is well-understood as detailed by Lowengrub and Co-workers (FDMP, vol. 3, no. 1, pp. 1-19, 2007). Thuo and co-workers have extended this knowledge into the so-called SLICE method to give patchy particles (PCT/US14/69802 filed Dec. 11, 2014, (WP/2015/089309) and Langmuir, 30, pp. 14308-14313, 2014). Despite tremendous advances in theoretical understanding of spinodal decomposition, and the prediction that Janus-type particles can be obtained as the ultimate thermodynamically relaxed state in binary systems, there have been no reports on spinodal decompositions resulting in purification or selective isolation of some components of a mixture or metal alloy.

SUMMARY OF THE INVENTION

In certain illustrative embodiments of the present invention, a physical and chemical method is used to de-mix (e.g. separate and/or purify) the phases of a dispersion or emulsion of a metallic alloy or mixture of material in a fluid. The dispersion or emulsion is dissociated into smaller particles or droplets respectively which are highly enriched in the respective metals. In some embodiments, one of the components is selectively drawn to the surface when the interfacial surface tension (between the material and the media) is highly unfavorable and mechanical stress is applied to the material. Other embodiments of the invention can be practiced by applying mechanical stress to particulates without their being in a dispersion or emulsion.

In the illustrative embodiment of the present invention, a binary alloy in liquid form comprising a first metal (e.g. Bi) and a second metal (e.g. Sn) is subject to shear and interfacial stress, using an fluid with a significantly lower surface tension relative to the metal, leading to fragments that are highly enriched (increased) in the first metal (e.g. Bi) and other fragments that are enriched in the second metal (e.g. Sn) either in their pure form (oxidation state 0) or in reduced form where a reactive media is used. A similar process is also shown to separate the phases of a ternary alloy metal (e.g. here a eutectic metal of Bi, In and Sn elements or components) and of a multi-component material (e.g. here a solid alloy mostly composed with Nd, Fe, B and Dy elements or components). The enriched particles can be separated from each other by e.g. filtration techniques, derivatization, or through differences in their densities, into a respective first metal-enriched particle product and a second metal-enriched particle product. This separation being a diffusion limited process, four parameters are engineered to accelerate the separation process, viz; i) surface stress through applying mechanical to promote diffusion of a low shear modulus component of the alloy or mixture, ii) creating dissimilar interfaces (large interfacial surface energy between the component and the fluid media to promote migration of the low surface energy component of the alloy or mixture to the surface), iii) increasing diffusion of a target component by increasing the working temperature, and iv) introducing a reactive species that targets selective etching or removal (dissolution) of one or a few of the components of the alloy or mixture to thermodynamically de-stabilize the alloy or mixture and accelerate spinodal decomposition, therefore enhancing the separation by introducing a chemically favorable sink to compliment the thermodynamic relaxation.

The method pursuant to the invention provides a low cost, scalable and fast (one step only) process to separate or purify metal constituents of various binary, ternary, and other alloys or mixtures for use for instance in recovering metal constituents for recycling, purifying metals from ores.

These and other advantages of the present invention will become more readily apparent from the following detailed description taken with the following drawings.

DETAILED DESCRIPTION OF THE INVENTION

Figure 2:
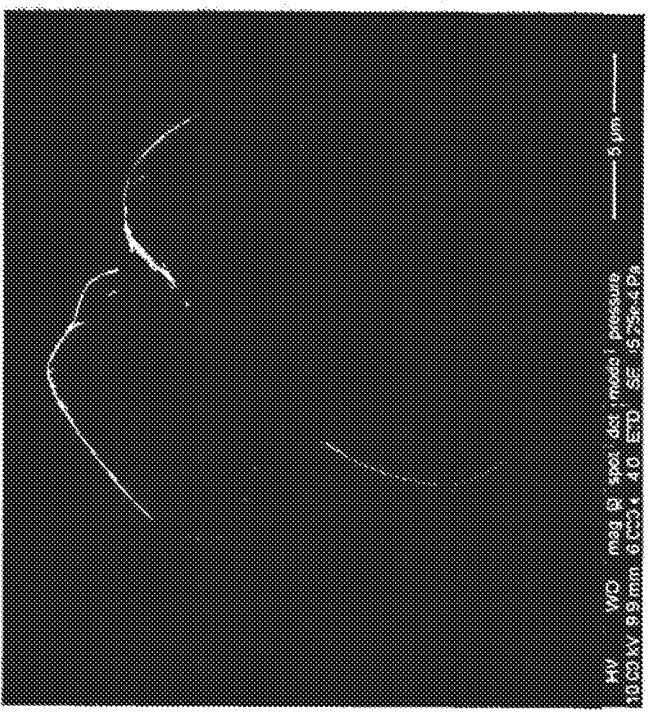
FIG. 2 is an EDS image of undercooled Bi-enriched microparticles, which were obtained after retention from a filter paper (11 μm pore size filter paper) and which comprised about 99 weight % Bi, balance Sn.
Figure 1:
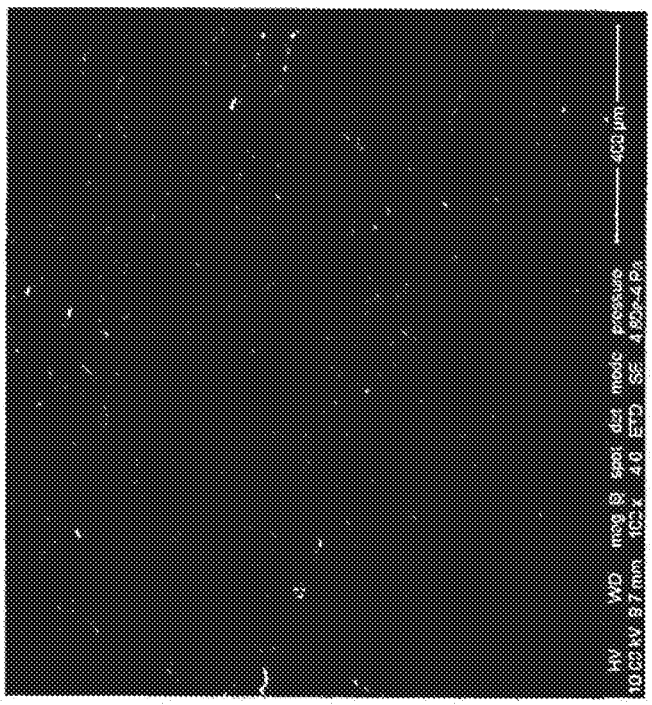
FIG. 1 is an EDS image of an undercooled Bi-enriched microparticle, which was obtained after retention from a filter paper (11 μm pore size filter paper) and which comprised about 99 weight % Bi, balance Sn.

The present invention describes a physical and chemical method to separate and/or purify the phases of a dispersion or emulsion of a metallic alloy or mixture of different materials. During the process, small solid particles or liquid droplets of highly enriched phases of the respective metals or materials are produced. Separation or purification is mostly controlled by surface energy, shear modulus, and/or chemical reactivity differences between the constituent metals. Practice of the method of the invention will be illustrated in detail below with respect to separation of a binary Bi—Sn eutectic alloy, a ternary alloy with respect to the separation of Bi—In—Sn eutectic (Field's metal) and higher order of multi-component solid alloys or intermetallics of Nd—Fe—B—Dy into respective metal constituents at relatively low temperatures above or below the melting point of the alloy at atmospheric pressure. The method of the invention can be practiced to separate or purify any multi-constituent media in liquid or solid state and is not limited to metal alloys and can be practiced with various mixed materials including, but not limited to, multi-constituent intermetallic materials; multiple adjacent metallic layers; a mixture of a metal alloy, intermetallic material, and their passivating or non-passivating surface oxides or analogous surface reaction products; at least one metal constituent and at least one polymeric constituent; at least one inorganic and/or polymeric constituent; and other materials as will become apparent from the examples set forth below. Embodiments of the invention can be practiced by applying any type of mechanical stress to particulates with or without their being in a dispersion or emulsion. Mechanical stress can include, but is not limited to, shear stress, compressive stress, and any other mechanical stress that effects migration of one or more constituents.

The method can be practiced with respect to metal alloys in the solid state, or in the liquid state having a melting point $T_m$ in the range of 26 to 1350° C. and above. Alloys with relatively low melting temperatures; e.g. a melting point $T_m$ less than 250 degrees C., can be subjected to separation into their metal constituents in ambient or near ambient conditions at atmospheric pressure.

For purposes of illustration and not limitation, a binary eutectic Bi—Sn alloy (57 weight % Bi and 43 weight % Sn having a melting point of about 139 degrees C. from Alfa Aesar) is separated using the aforementioned SLICE equipment (however without undercooling of the material or necessarily making them into particles) pursuant to an embodiment of the invention into particles (first particle product) that are highly enriched in Bi (first metal) and different particles (second particle product) that are enriched in Sn (second metal). Separation is facilitated by large surface tension differences between Bi and Sn (e.g. 380 mN/m vs. 560 mN/m for Bi and Sn, respectively). SLICE equipment is described in PCT/US14/69802 filed Dec. 11, 2014, (WO/2015/089309) and Langmuir, 30, pp. 14308-14313, 2014, the disclosures of which are incorporated herein by reference.

For example, the liquid (molten) eutectic Bi—Sn alloy is subjected to shearing using the aforementioned SLICE equipment, which embodies an extension of droplet emulsion technique (DET), in the presence of the dilute (about 2%) acetic, acid in diethylene glycol (carrier fluid). The shearing process involves shearing of liquid (molten) droplets of the eutectic Bi—Sn alloy in the presence of the carrier fluid together with chemical reaction.

In the separation of metal constituents of an alloy pursuant to embodiments of the invention, the following examples are offered:

Constituent Metal Separation—Example 1

Shear stressing under flow and large interfacial surface tension was used to achieve separation of the Bi and Sn metal constituents. For example, an amount [0.6 g (approx.)] of the eutectic Bi—Su alloy was added to dilute (about 1 vol. %) acetic acid in diethylene glycol solution (e.g. 0.1 mL acetic acid in 9.9 mL diethylene glycol). Acetic acid (Biotech, sequencing grade), diethylene glycol (BioUltra) and ethanol (200 proof) were purchased from Fisher, Sigma, and Ocean Laboratories Inc., respectively.

In Example 1 (JS-1-6A), the acetic acid/diethylene glycol solution (fluid) prepared in a glass vial (scintillation vials, 20 mL) was kept in oil bath at determined thermal stress temperature (160° C.) for at least 2 min before subjected to shear to make spherical particles—spherical particles were desired for ease of analysis but they are not necessary. Shear was applied using a Dremel 3000 variable speed rotary tool at the rate of 1200 rpm with extender accessory and cross-shaped (or any other desired geometry) poly(tetrafluoroethylene) (PTFE) shearing implement. The shearing implement was placed as close as possible to vial wall to enhance the effect of shear. Shearing stirring was conducted for 20 minutes (to make spherical particles) followed by gradual cooling to room temperature with stirring for 60 minutes during which time the phase solidification with concomitant phase separation occurs. Excess acetic acid and diethylene glycol was washed out with ethanol through filtering. Whatman #1 (particle retention of 11 μm), VWR Filter paper 494 (particle retention of 1 μm) and Whatman grade EPM 2000 (particle retention of 0.3 μm) filter papers were used for separation and cleaning of particles. Particles were stored in ethanol.

Particle Characterization

The resulting particles were characterized with scanning electron microscopy (FEI Quanta 250 FE-SEM). The SEM were operated under high vacuum at the voltage of 8-10 kV. Both the secondary electron and the energy selective backscattering (EsB) mode were used to image the samples. Chemical characterization were conducted by energy dispersive X-Ray spectroscopy (EDS). Additional characterization was performed on a Zeiss Supra 55VP Field Emission SEM. Samples were imaged using an electron beam accelerating voltage of 3 kV and a working distance of 3.3 mm. Images were collected using an In-lens detector or an Everhart-Thornley secondary electron detector. Elemental analysis was performed at a working distance of 8.5 mm and using electron beam accelerating voltages of 15 kV. Elemental composition was determined using an Energy Dispersive x-ray Spectrometer with a silicon drift detector.

Example 1 produced a mixture of relatively large, rough-surface particles comprised of almost pure Bi (EDS showed Bi=99.0 weight % or more) and a precipitate of organometallic Sn. The organometallic precipitate comprised chelated Sn in high concentration of 75-99 weight % with the impurities being adventitious in nature.

FIG. 2 is an EDS image of an undercooled Bi-enriched microparticle from Example 1, which comprised about 99 weight % Bi. The microparticle was taken from a first filtering step of the acetic acid shearing solution using filter paper (11 μm filter paper retention).

Figure 3:
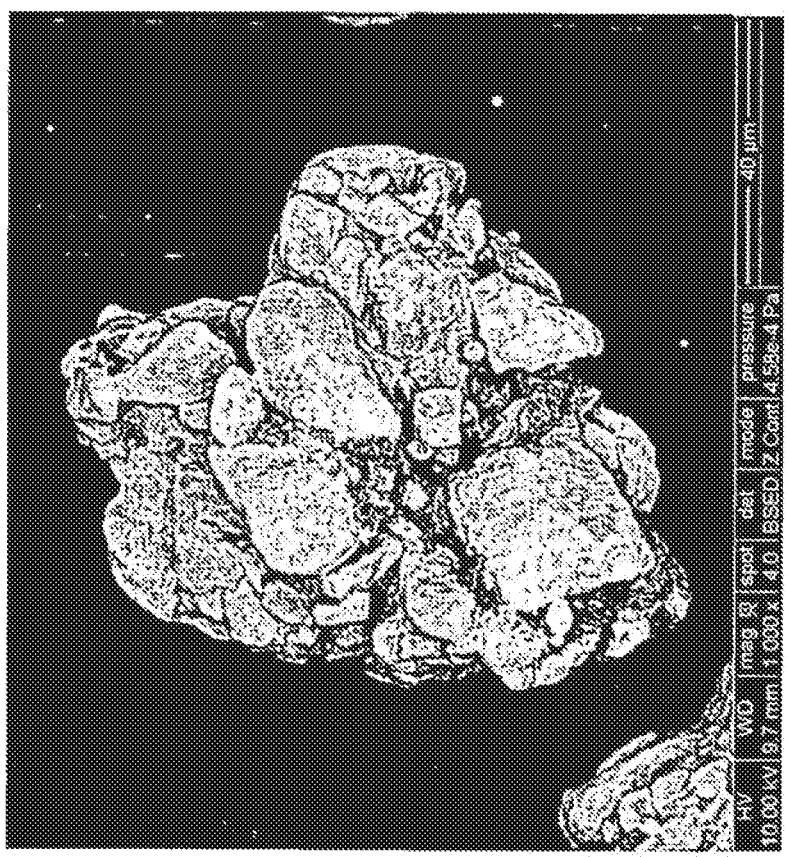
FIG. 3 is an EDS image of one of the undercooled Bi-enriched microparticles of FIG. 3.
Figure 4:
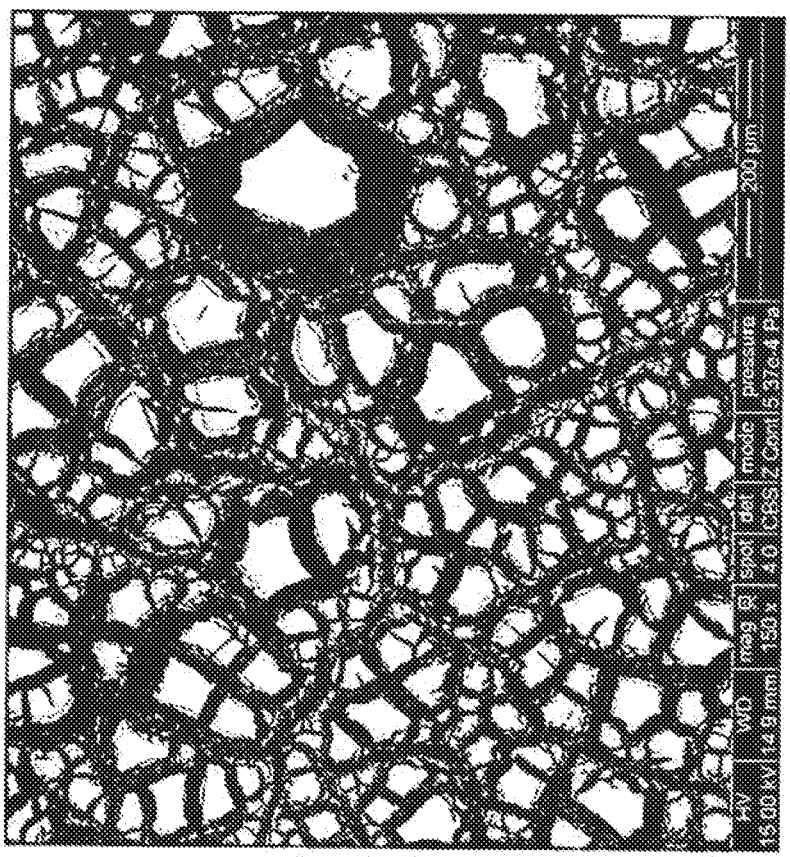
FIG. 4 is an SEM image of Sn oxide microparticles from a post-filtered acetic acid solution of particles that was kept for three weeks and then imaged following further filtration using paper filter retention of 0.3 μm.

FIG. 3 is an EDS image of other undercooled Bi-enriched microparticles from Example 1, which were taken from a first filtering step of the acetic acid solution using filter paper (11 μm filter paper retention). FIG. 4 is an EDS image of one of the undercooled Bi-enriched microparticles of FIG. 3.

FIG. 4 is an SEM image of precipitated Sn from a post-filtered acetic acid solution of particles that was kept for three weeks of Example 1 and then imaged following further filtration using paper filter retention of 0.3 μm. The Sn precipitate are primarily Sn adducts.

Example 1 demonstrates that the binary Bi—Sn eutectic alloy will be separated by practice of illustrative embodiments of the invention into particles that are highly enriched in Bi metal and to different Sn oxide particles that are highly enriched in Sn. The different particles were Separation of Constituent Metal
Separation—Example 2

The example involved applying shear stress under flow and large interfacial surface tension to achieve separation of the Cu from a shredded yellow brass alloy 260 sheet (shredded alloy chips of 0.25 inch×0.25 inch×0.025 inch in a manner similar to the examples 1 and 3 at a thermal stress temperature of 130° C. The Cu was separated as copper hydroxide, which formed as a result of the shearing process in the carrier fluid and can be treated to recover the copper content; concomitantly, the zinc is recovered as aggregates that vary in size from a few micrometers to millimeter scale. Separation of ternary materials with the Example 3 of Bi—In—Sn eutectic (Field's metal, 32.5% weight Bi, 51% weight In, 16.5% weight Sn):

Constituent Metal Separation

For the separation of the ternary metal, a similar process was used: an amount (2 g. approx.) of the eutectic Bi—In—Sn alloy was added to a diluted solution (about 5 vol. %) of acetic acid in diethylene glycol (e.g. 2.5 mL acetic acid in 47.5 mL Methylene glycol). Acetic acid (Biotech, sequencing grade), diethylene glycol (BioUltra) and ethanol (200 proof) were purchased from Fisher Sigma, and Decon Laboratories Inc., respectively.

In Example 3 (CF-1-47), the acetic acid and diethylene glycol solution (fluid) was first poured in a soup maker (Cuisinart SBC-1000 Blend-and-Cook Soup Maker) and heated up to an approximately constant temperature of 85° C. The metal is then poured in the solution and kept approximately 2 minutes in solution to allow melting of the alloy before being sheared (the temperature is maintained at approximately 85° C. for the entire experiment). Shear was applied by the soup maker blades rotating at 7500 rpm. Shearing stirring was conducted for up to 60 minutes. The excess of solution of acetic acid and diethylene glycol was washed out with ethanol through filtering Whatman grade EPM 2000 (particle retention of 0.3 μm) filter papers were used for separation and cleaning of particles. Particles were stored in ethanol.

Figure 5A:
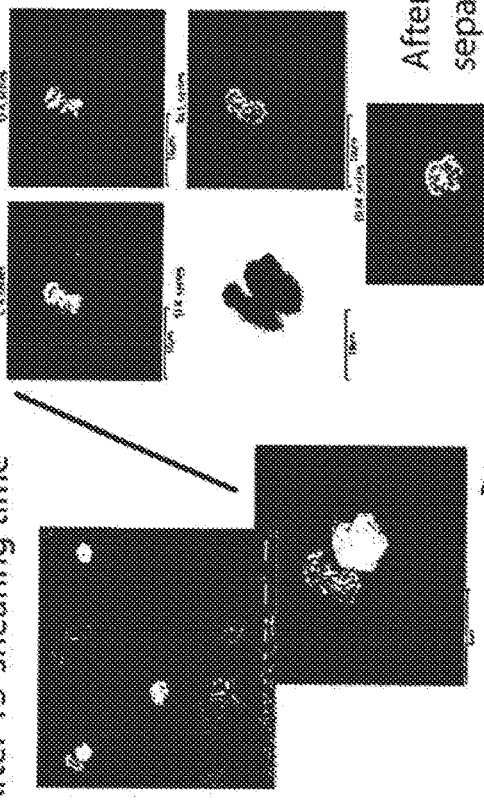
FIGS. 5A, 5B show the SEM images of the particles resulting from the illustrative method after 15 minutes (15') (FIG. 5A) mixing and 30 or more minutes (30') (FIG. 5B) mixing. By EDS analysis, the light white colored particles are composed with more than 90% weight Bi while grey colored particles are composed with more than 70% weight In. Sn is present in solution after having been dissolved by the acetic acid/diethylene glycol solution (not shown).
Figure 5B:
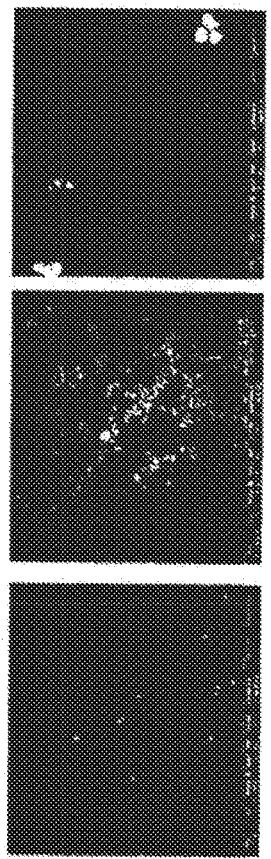

FIG. 5A shows the SEM images as well as the EDS analysis of the particles resulting from this mixing process after 15 minutes (FIG. 5A) mixing and 45 minutes (FIG. 5B) mixing. Light white colored particles are composed with more than 90% weight Bi while grey colored particles are composed with more than 70% weight In. Sn is present in solution after having been dissolved by the acetic acid/diethylene glycol solution (not shown). Fifteen (15) minutes shearing time seem to be sufficient here (with the chemical, mechanical and thermal conditions mentioned above) to separate entirely each phases of the materials into purified particles of each constituents, as exemplified by FIG. 5B obtained in the SEM from particles that have been sheared approximately 45 minutes.

Separation of multi-component materials with the Example 4 of Nd—F3—B—Dy intermetallic magnetic particles (50-55% wt. Fe, 30-35% wt. Nd, 5-10% Dy, ≈7% wt. B, traces of Co, Cu, Al, Ni): This intermetallic material system of constituents was selected because of the differences in interfacial energy (surface tension), elastic properties (Young's shear modulus and shear modulus) and chemical reactivity of the constituent phases as well as the critical importance rare earth metals.

Constituent Metal Separation

For the separation of the multi-component metallic alloy, a similar process was used: an amount (2 g. approx.) of the NdFeB crushed millimeter-size solid particles was added to a diluted solution of acetic acid in diethylene glycol. Acetic acid (Biotech, sequencing grade), diethylene glycol (BioUltra) and ethanol (200 proof) were purchased from Fisher, Sigma, and Decon Laboratories Inc., respectively.

In Example 4a (CF-2-7), the acetic acid (200 μL) and diethylene glycol (≈50 mL) solution (fluid) was first poured in a soup maker (Cuisinart SBC-1000 Blend-and-Cook Soup Maker) and maintained at a temperature of approximately 55° C. Shear was applied by the soup maker blades rotating at 17,000 rpm. Shearing stirring was conducted for up to 180 minutes. The excess of solution of acetic acid and diethylene glycol was washed out with ethanol through filtering. Whatman grade EPM 2000 (particle retention of 0.3 μm) filter papers were used for separation and cleaning of particles. Particles were stored in ethanol.

In Example 4b (CF-2-6), the acetic acid (200 μL) and diethylene glycol (≈50 mL) solution (fluid) was first poured in a soup maker (Cuisinart SBC-1000 Blend-and-Cook Soup Maker) and maintained at a temperature of approximately 100° C. Shear was applied by the soup maker blades rotating at 7800 rpm. Shearing stirring was conducted for up to 180 minutes. The excess of solution of acetic acid and diethylene glycol was washed out with ethanol through filtering, What an grade EPM 2000 (particle retention of 0.3 μm) filter papers were used for separation and cleaning of particles. Particles were stored in ethanol.

Figure 6A:
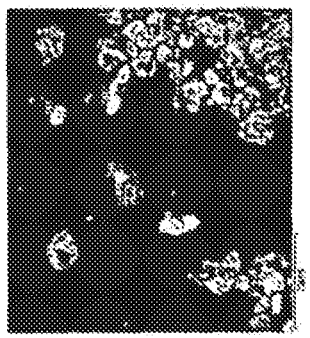
FIG. 6A shows the SEM images of the particles (Example 4a—Nd—Fe—B—Dy particles) resulting from the illustrative method after 30 minutes mixing. Light white colored particles are composed of more than 75% weight of rare earth metals (Nd and Dy), while grey colored particles are composed with more than 40% weight Fe and more than 30% Nd, which shows that these particles have not yet entirely been separated. AA is acetic acid.
Figure 6B:
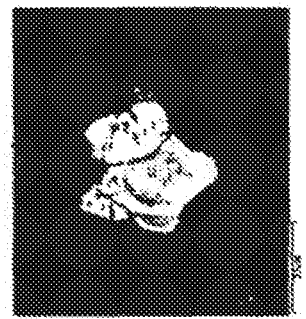
FIGS. 6B and 6C show the SEM images of the particles (Nd—Fe—B—Dy) of the other examples.
Figure 6C:
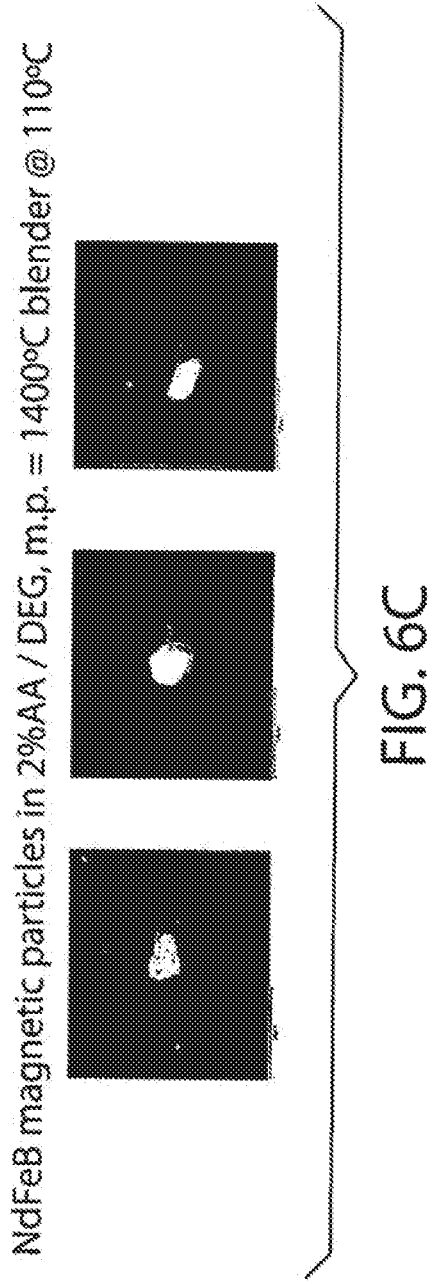

FIG. 6A shows the SEM images as well as the EDS analysis of the particles (Example 4a) resulting from this mixing process after 30 minutes mixing. Light white colored particles are composed with more than 75% weight of rare Earth metals (Nd and Dy) while grey colored particles are composed with more than 40% weight Fe and more than 30% Nd, which shows that these particles have not yet entirely been separated. Other materials are also listed on the EDS results with a much minor importance (<10% weight). Fe is mostly dissolved and present in the solution obtained after filtration of the particles and before rinsing with Ethanol (not shown here). In all the other examples (FIGS. 6B and 6C), the SEM and EDS analysis confirm the presence of more than 75% weight of rare Earth metals in light white colored particles.

In the above Examples, although a Dremel driven tool or commercial blender was used to apply shear at the indicated mixer rpm, higher rpm values can be used to produce higher shear stress. By adapting the time of the mixing process and the rotational speed, one can obtain similar results if other parameters such as chemical composition or temperature of the etchant are kept constant. The rotational speed of the mixer blades controls the shear forces acting on the particle. In addition to the Dremel driven tool and commercial blender described above for illustration, a Silverson Model L5M-A overhead lab mixer can be for used in practice of the invention for further purposes of illustration to provide an rpm value of 10,000 rpm.

Although Example 1 (JS-1-6A) above employed the low melting Bi—Sn eutectic alloy in the liquid state for purposes of illustration, alloys with higher melting point, $T_m$, than the binary Bi—Sn eutectic can be separated using embodiments of the invention wherein the medium comprises a material such as an ionic liquid [e.g. (BMIM)(PFNFSI) which decomposes at $T_d$ of 290° C. and quaternary ammonium ionic liquids]; or polar hydrocarbon liquid (e.g. polyphenyl ether pump fluid, boiling point $T_b$ approximately 475° C. at 760 mmHg) having a higher melting point that allows the process to be practiced at the suitable temperature. (BMIM)(PFNFSI) is 1-butyl-3-methylimidazolium N-pentafluorphenylnonafluorbutylsulfonamide. Other ionic liquids having appropriate $T_m$'s that can be used below their decomposition temperature ($T_d$) and above their $T_m$ are described in Zhang, Physical Properties of Ionic Liquids: Database and Evaluation, J. Phys, Chem. of Data, Vol. 35, No. 4, 2006, the disclosure of which is incorporated herein by reference, and include, but are limited to, [NH$_4$][NO$_3$]; [TMA][BF$_4$]; [TEA][BF$_4$]; [TPA][BF$_4$]; [TBA][BF$_4$] where TMA is tetramethyl ammonium; TEA is tetraethyl ammonium; TPA is tetramyl ammonium; and TBA is tetrabutyl ammonium. These media can be used to shear higher melting point alloys in their liquid or molten state, although as demonstrated above alloys can be sheared in their solid particulate state. Moreover, although the above examples employed certain liquid fluids for the shearing step, other fluids that can be used in a shearing step include air or other gases.

Separation of multi-mixed materials with the Example 5 of bonded Nd—Fe—B—Dy magnet (NdFeBDy magnetic particles in a Nylon matrix): This system of constituents were selected because of the differences in interfacial energy (surface tension), elastic properties (Young's shear modulus and shear modulus) and chemical reactivity of the constituent phases as well as the ethical importance of rare earth metals.

Constituent Metal Separation

For the separation of this multi-mixed material, the bonded magnet was placed in a solvent that swells (chemical stresses) the Nylon polymer matrix in a shearing apparatus so that the solvent is used as the carrier fluid for the shearing process, which is conducted in concurrent manner at a temperature of 90° C. using 1200 rpm magnetic stirrer for 2-6 hrs (depending on quantity). The solvent was water, a solution of acetic acid and di-ethylene glycol, or dichloromethane. The carrier fluid was filtered with a Whatman no. 1 filter paper, which revealed that the concurrent application of the shearing force to the swollen material separated the denser NdFeB phase of the mixed material so that the NdFeB particles were sheared pursuant to the invention as described above to separate the rare earth metals Nd and Dy together in the same particles from the Fe and B which remain in the carrier fluid. The polymer and carrier fluid are collected as the filtrate, while the solid magnetic particulates are obtained on the filter paper. Repeated washing of the solids can be used to remove any residual polymeric material. Alternately, the method embodiment of this example can be conducted using separate steps of first swelling the Nylon polymer matrix and then subjecting the swollen mixed material to the shearing process.

Separation of multi-mixed materials with the Example 6 of a microelectronic motherboard having soldered gold electrical connections:

Constituent Separation

For the separation of this multi-mixed material, small cut pieces of the microelectronic inorganic motherboard (from an electronics recycling facility) are cleaned and placed in a solvent, such as dichloromethane, that swells the mostly polyurethane glue layer beneath a conventional adlayer (either iron or zinc layer on which the gold is deposited and soldered) in a shearing apparatus of the type described above using a magnetic stirrer rotated at 500 rpm at room temperature for three days. At the end of the shearing process, the solution was filtered with a Whatman no. 1 filter paper (11 µm pore size), and the recovered material was placed in a scintillation vial in ethanol. The concurrent application of the shearing force to the cut pieces was found to separate the denser gold material from the adjacent Fe or Zn adlayer and any remaining solder. Alternately, the method embodiment of this example can be conducted using separate steps of first removing the solder and then subjecting the motherboard pieces to the shearing process to recover the gold.

Air-Driven Separation of Constituent Metal Separation—Example 7

Shear stressing under flow and large interfacial surface tension was used to achieve separation of FM (Sn—Bi) alloy using hot air as the shearing fluid directed from a laboratory hot air dryer across polished FM particles. A tin oxide surface reaction product was observed to be located on and to peel off of the surfaces of the FM particles after the air-driven shearing process to de-mix the Cu from the alloy. This example is offered to illustrate that shearing fluids other than liquids can be used in practice of embodiments of the invention. Also, the example illustrates shear stress the mixed particulates without their being in a dispersion or emulsion.

The present invention can be practiced to recover metal constituents of an alloy for recycling and for purifying metals that contain unwanted metal constituent(s). The unwanted metal constituent(s) can be removed (separated out) from the wanted metal by practice of the invention.

Although the present invention has been described with respect to certain illustrative embodiments, those skilled in the art will appreciate is not limited to these embodiments and that changes and modifications can be made therein within the scope of the invention as set forth in the appended claims.

We claim:

1. A method for de-mixing constituents of a mixed material, comprising
applying at least one of mechanical stress, thermal stress, and chemical stress to particulates of the mixed material in a fluid, wherein the mixed material comprises a first metal and a second material, wherein the mechanical stress, thermal stress, or chemical stress is applied under conditions to achieve de-mixing of at least one of the constituents of the mixed material to form a first particle product that is enriched in the first metal relative to the mixed material and to form a second product dissolved in the fluid, wherein the second product is enriched in the second material relative to the mixed material.

2. The method of claim 1, wherein the mixed material comprises a metal alloy comprising a liquid alloy and/or a solid alloy.

3. The method of claim 1, wherein the mixed material comprises a first metal layer and an adjacent second metal layer.

4. The method of claim 1, wherein the mixed material comprises NdFeBDy.

5. The method of claim 1, wherein a polymer comprises the mixed material.

6. The method of claim 5, wherein the polymer matrix comprises nylon.

7. The method of claim 5, wherein mixed material comprises NdFeBDy.

8. The method of claim 5, wherein the fluid swells the polymer matrix to separate the mixed material therefrom.

9. The method of claim 1, wherein a magnet comprising a nylon matrix comprises the mixed material, wherein the mixed material comprises NdFeBDy particles.

10. The method of claim 1, wherein the mixed material comprises yellow brass.

11. The method of claim 1, wherein the fluid comprises a liquid, a gas, a reactive fluid that selectively etches or dissolves at least one of the constituents of the mixed material, or a combination thereof.

12. The method of claim 1, wherein the fluid comprises a liquid.

13. The method of claim 1, wherein the fluid comprises acetic acid, diethylene glycol, water, dichloromethane, ethanol, an ionic liquid, or a combination thereof.

14. The method of claim 1, wherein the first metal comprises a rare earth metal.

15. The method of claim 1, wherein the first metal comprises Nd, Dy, Zn, or a combination thereof.

16. The method of claim 1, wherein the second material comprises a metal, an organometallic material, a polymer, an inorganic material, or a combination thereof.

17. The method of claim 1, wherein the second material comprises Cu, Fe, B, or a combination thereof.

18. The method of claim 1, wherein the second product comprises $Cu(OH)_2$, Fe, B, or a combination thereof.

19. The method of claim 1, wherein:
the mixed material comprises yellow brass;
the first metal comprises Zn;
the second material comprises Cu; and
the second product comprises $Cu(OH)_2$.

20. The method of claim 1, wherein:
a magnet comprising a polymer matrix comprises the mixed material;
the mixed material comprises NdFeBDy particles;
the fluid swells the polymer matrix to separate the mixed material therefrom;
the first metal comprises Nd and Dy; and
the second product comprises Fe and B.

* * * * *

UNITED STATES PATENT AND TRADEMARK OFFICE
CERTIFICATE OF CORRECTION

| | |
|---|---|
| PATENT NO. | : 11,364,542 B2 |
| APPLICATION NO. | : 16/924408 |
| DATED | : June 21, 2022 |
| INVENTOR(S) | : Thuo et al. |

It is certified that error appears in the above-identified patent and that said Letters Patent is hereby corrected as shown below:

On the Title Page

In Column 2, under Item (56) "U.S. Patent Documents", Line 3, delete "2017/0036861" and insert --2017/0368610-- therefor In the Specification In Column 1, Line 9, delete "whis" and insert --which-- therefor In Column 1, Line 39, delete "(WP/2015/089309)" and insert --(WO/2015/089309)-- therefor In Column 4, Line 2, delete "acetic," and insert --acetic-- therefor In Column 4, Line 15, delete "Bi-Su" and insert --Bi-Sn-- therefor In Column 4, Line 20, delete "Ocean" and insert --Decon-- therefor In Column 5, Line 45, delete "Methylene" and insert --diethylene-- therefor In Column 5, Line 57, delete "7500" and insert --7800-- therefor In Column 6, Lines 49-50 delete "What an" and insert --Whatman-- therefor In Column 7, Line 32, delete "include," and insert --include-- therefor In Column 7, Line 49, delete "ethical" and insert --critical-- therefor Signed and Sealed this
Ninth Day of May, 2023

Katherine Kelly Vidal
*Director of the United States Patent and Trademark Office*

In the Claims

In Column 8, Line 59, in Claim 1, after "comprising", insert --:--

In Column 9, Line 13, in Claim 5, after "polymer", insert --matrix--